Dec. 23, 1952   W. E. SLAVENS   2,622,382
CORNHUSKING MECHANISM
Filed Sept. 27, 1950   2 SHEETS—SHEET 1
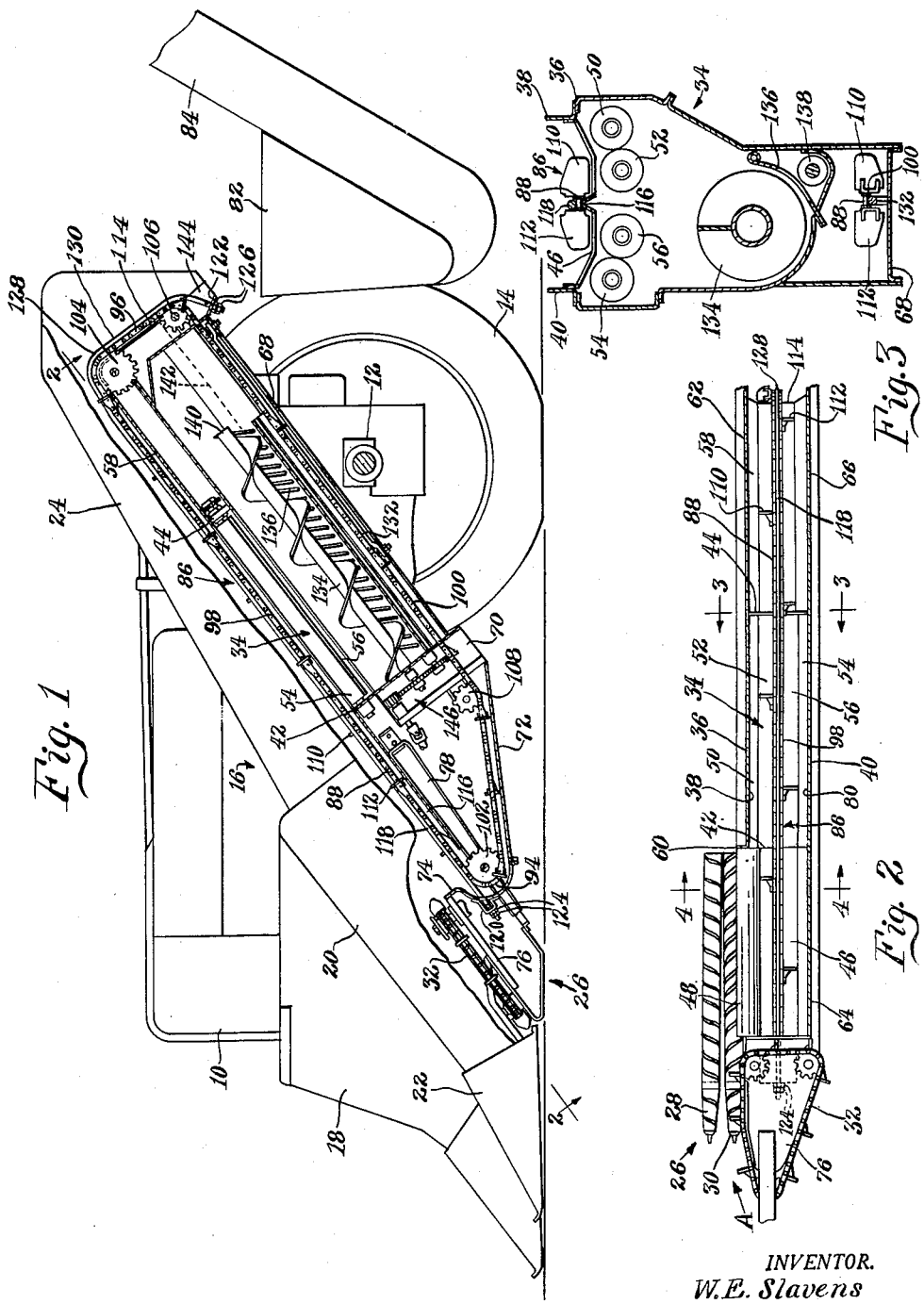
INVENTOR.
W. E. Slavens
BY
C. T. Parker and H. M. Luoto
Attorneys Dec. 23, 1952 W. E. SLAVENS 2,622,382
CORNHUSKING MECHANISM
Filed Sept. 27, 1950 2 SHEETS—SHEET 2

INVENTOR.
W. E. Slavens
BY
Parker and H. M. Knoth
Attorneys

Patented Dec. 23, 1952

2,622,382

UNITED STATES PATENT OFFICE 2,622,382

CORNHUSKING MECHANISM

Wayne E. Slavens, Des Moines, Iowa, assignor to Deere Manufacturing Co., Dubuque, Iowa, a corporation of Iowa Application September 27, 1950, Serial No. 186,984

18 Claims. (Cl. 56—18)

This invention relates to material-handling means and particularly to such means as exemplified in a conveyor for moving crops, such as corn, over crop-handling means, such as husking mechanism of the type found in corn harvesting machinery.

The typical corn harvester comprises a frame carried by an agricultural tractor or by its own wheels for movement over a field of standing corn and includes fore-and-aft extending supporting structure having at its front end means for gathering the corn and at its rear end means for husking the ears of corn. The husking mechanism will normally comprise a plurality of rolls over which the ears of corn are moved and which operate to remove the husks from the ears. It is conventional to utilize some form of conveyor for moving the ears lengthwise over the husking rolls to a point of discharge for delivery to a hopper or the like, whence the husked ears may be delivered ultimately to a suitable receptacle, such as a wagon towed behind the harvester.

Although the fundamentals involved in the handling of the gathered and husked corn are fairly well comprehended by designers of the type of machinery referred to, and the design of the various mechanisms is fairly well stabilized, there are several problems that remain to be eliminated. For example, it is known to arrange the gathering means and the husking mechanism in fore-and-aft alinement and to utilize a conveyor known as a first elevator for moving the gathered corn from the gathering means to the husking mechanism, but there has not heretofore been provided a simple and inexpensive conveyor that will operate efficiently in accomplishing the transfer of corn from the gathering means to the husking means as well as efficiently moving the ears over the husking rolls. According to the present invention, such improved conveyor is provided, preferably in the form of a central endless element such as a link and roller chain having ear-engaging flights or paddles projecting from opposite sides thereof. This chain operates about rotary elements such as sprockets disposed in a fore-and-aft upright plane, so that the flights or paddles are transverse to the chain. The chain is appropriately retained and guided by track and guide means which in one form of the invention comprises a rod or equivalent elongated member contacting the rollers of the chain from above and holding the chain against upward displacement relative to the husking rolls, and which, in another form of the invention, comprises a single member having grooves at opposite sides thereof engaging and slidably receiving portions of the flights for holding the chain against upward displacement. In both forms of the invention, the single conveyor chain or equivalent endless element and the track and guide means run centrally and longitudinally between two pairs of parallel husking rolls, so that the flights at one side of the chain operate over one pair of rolls and the flights at the other side operate over the other pair of rolls.

In that form of the invention in which the track and guide means comprises the hold-down rod or equivalent means, provision is made for adjusting the tension on the hold-down means, and means is also provided for adjusting the position of the means with respect to the chain. Another feature of the invention is to provide a single endless chain or equivalent element which has an upper run movable rearwardly over the husking rolls and a lower run movable downwardly below the husking mechanism. Still another feature of the invention resides in the utilization of the chain to move husked ears across or through a discharge zone at the rear of the husking mechanism, in which case, the hold-down means likewise extends across and downwardly at the end of the ear-discharge zone.

The foregoing and other important objects and desirable features inherent in and encompassed by the invention will become apparent from the following detailed description and accompanying sheets of drawings wherein are described and illustrated two preferred embodiments of the invention.

In the drawings:

Figure 1 is a side elevational view of a tractor-mounted harvester, with portions of the external shielding and tractor broken away to expose in section inner portions of the gathering and husking mechanisms;

Figure 2 is a fragmentary longitudinal sectional view taken substantially on the line 2—2 of Figure 1;

Figure 3 is a transverse sectional view, on an enlarged scale, taken on the line 3—3 of Figure 2;

Figure 4:
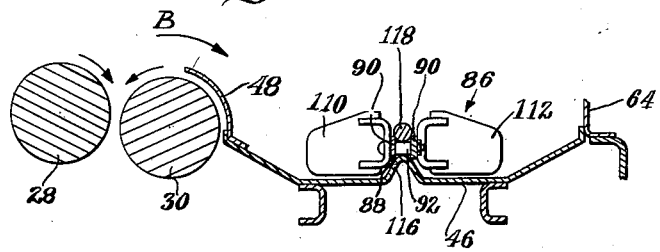
Figure 4 is a fragmentary transverse sectional view, on a still further enlarged scale, taken substantially along the line 4—4 of Figure 2.

Although the invention is illustrated in connection with a tractor-mounted harvester, it is to be understood that the harvester may be of any other type, such as a harvester supported on its own wheels and adapted to be drawn alongside of or behind a tractor or other vehicle. Primarily, the basic supporting structure illustrated is for background purposes only.

Figures 1 through 5

The tractor chosen for the purposes of illustration is typical of the conventional agricultural tractor and has a longitudinal body 10 carried at its front end on front wheels (not shown) and at its rear end on a transverse rear axle structure 12 including traction wheels, only one of which is shown at 14, the near traction wheel having been removed. A corn-harvesting unit, designated generally by the numeral 16, is carried by the tractor in any suitable manner and extends fore and aft or longitudinally of the tractor. A similar unit may be used at the opposite side of the tractor, in which case the tractor-mounted harvester is of the two-row type.

The harvesting unit shown comprises supporting structure including external shielding 18 providing a central divider located ahead of the tractor front wheels, gathering mechanism side sheets 20, including a forward divider point 22, and shield structure 24 extending rearwardly from the gathering mechanism side sheets 20 to a point rearwardly of and above the tractor rear axle 12. The supporting structure includes other components that will be described below in greater detail.

The gathering mechanism is designated in Figures 1 and 2 generally by the numeral 26 and may comprise, as is conventional, a pair of rotatable snapping rolls 28 and 30 and a gathering chain 32, of which there may be several. As the harvester moves forwardly, the snapping rolls 28 and 30 are centered on a row of standing stalks and the rolls rotate toward each other to snap ears from stalks received therebetween. The gathering chain 32 moves in the direction of the arrow A to assist in the feeding of stalks to the snapping rolls.

Rearwardly of the gathering means 26 is husking mechanism, designated generally by the numeral 34. This mechanism comprises a husk box 36 of elongated generally rectangular construction having opposite, fore-and-aft extending upright sides 38 and 40 and opposite generally upright front and rear ends 42 and 44. As best shown in Figure 2, the husk box is located rearwardly of and offset laterally to the outside of the snapping rolls 28 and 30. An elongated, upwardly inclined floor 46 is provided ahead of the forward end 42 of the husk box 36 so as to lie alongside the snapping rolls 28 and 30 (Figures 2 and 4). The inner side of the floor 46 includes an inwardly curved elongated shield 48 shaped somewhat to conform to and lie alongside the snapping roll 30, so that ears of corn snapped from stalks by the snapping rolls 28 and 30 may fall over the shield 48 onto the floor 46, as suggested by the arrow B in Figure 4. The rear end of the shield 48 terminates at the forward end 42 of the husk box 36.

The husking mechanism includes a plurality of husking rolls, here two pairs 50—52 and 54—56. These husking rolls, as shown, extend from front to rear and have their front and rear ends journaled in appropriate bearings in the ends 42 and 44 of the husk box 36. The husking rolls may be driven in any suitable manner, the details of which are not important in the present disclosure.

An elongated, upwardly inclined floor 58 extends rearwardly from the rear end of the husk box 36, substantially co-planar with the forward floor portion 46. This floor portion 48 comprises part of a husked-ear-discharge zone or means, further details of which will be set forth below. The forward end of the inner side wall 38 of the husk box terminates at 60 adjacent the rear of the curved shield 48 and the rear portion thereof extends at 62 along the inner side of the floor 58. The outer side wall 40 of the husk box extends forwardly at 64 to a point just rearwardly of the gathering chain 32 and extends rearwardly at 66 along the outside of the floor 58.

The husk box 36, as illustrated here, is of substantial depth and has a fore-and-aft extending bottom support 68 forming part of the supporting structure referred to above. Another part of this supporting structure includes what may be termed a housing 70 at the forward end of the husking mechanism, from which housing extends a forwardly projecting bottom shield 72 terminating at its forward end in a curved boot section 74 just behind and below the gathering chain 32. Part of the supporting structure for the gathering chain 32 includes an upwardly and rearwardly inclined plate 76 to which the upper portion of the boot section 74 may be secured. The plate 76, as well as bearings for the snapping rolls (which bearings are not shown) may be carried, as is generally conventional, on a rearwardly and upwardly inclined support 78 having connection, in this case, to the housing 70.

From the description thus far, it will be seen that the husk box 36 is an elongated structure open at its top as at 80 (Figure 5) to expose the husking rolls 50—52 and 54—56 from above. The floor 46 leads from the gathering mechanism to the husking mechanism and the floor 58 leads away from the husking mechanism to provide ear-discharge means for the ultimate delivery of ears rearwardly to ear-receiving means, such as a hopper 82, carried at the rear of the tractor in any appropriate manner, and with which is associated a rearwardly and upwardly extending elevator 84, which may be used for transferring the husked ears to a suitable receptacle, such as a wagon (not shown) towed behind the harvester, as is conventional. For the purpose of moving ears from the gathering means to the rear point of discharge, there is provided a conveyor designated generally by the numeral 86. This conveyor preferably comprises a single endless flexible belt-like element, herein the form of an endless chain 88 made up of a plurality of articulately connected links 90 (Figure 4) and transverse rollers 92. This chain operates in a fore-and-aft extending upright plane and includes a forward loop 94 within the boot 74 adjacent the gathering chain 32, a rearward loop 96 rearwardly of the ear-discharge floor 58, a first or upper run 98 and a second or lower run 100. The upper run operates above and centrally between the two sets of husking rolls 50—52 and 54—56; and the lower run operates along the bottom of the husking mechanism, just above the bottom support 68. The means for carrying the chain 88 comprises a forward rotary element or sprocket 102 rotatable in the boot 74, and a rear rotatable element or sprocket 104 located in the ear-discharge zone. The supporting means for the chain further includes a third rotary element or sprocket 106 just below the sprocket 104 and a fourth rotary element or sprocket 108 forwardly of the housing 70 and rearwardly of the sprocket 102. The chain is so arranged that its upper run 98 travels rearwardly and upwardly over the floor 46, the husking rolls, and the rear floor 58. The chain travels thence downwardly about the sprocket 104 and thence around the sprocket 106 and forwardly below the husking mechanism. The conveyor further includes a plurality of ear-engaging flights or paddles 110 at one side of the chain and 112 at the other side of the chain. As best shown in Figure 2, the flights 110 are alternately arranged or staggered with respect to the flights 112. Figure 4 illustrates one manner in which the flights may be attached to the links 90 of the chain 88.

The ear-discharge means or zone, of which the rear floor 58 forms a part, includes a downwardly and rearwardly inclined wall 114 having its lower end disposed just above the hopper 82. Thus, as ears are moved across the shield 48 to the floor 46, the conveyor 86 moves these ears rearwardly to and across the husking rolls, where they are husked, and then moves the ears over the floor 58 and downwardly over the wall 114. The particular configuration of the floor 46 relative to the husking rolls 50—52 and 54—56 may be seen in Figure 3. It will be understood that the floor 58 may have the same configuration. Thus, the ears, during rearward travel, are confined by the opposite side walls 38 and 40 of the husk box and the extensions 62 and 66 of those walls as the ears move over the floor 58.

Figure 5:
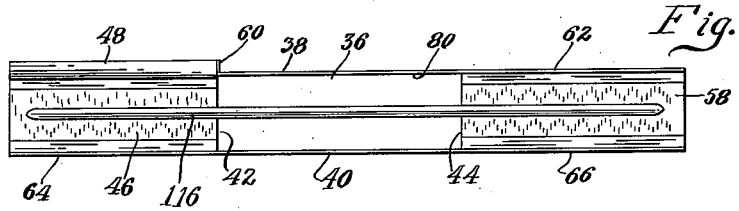
Figure 5 is a plan view of the husking box, with all movable components removed, to illustrate better the forward portion thereof over which ears are moved from the gathering mechanism to the husking mechanism and the rearward portion thereof over which ears are moved for discharging to a receptacle at the rear of the harvester.

For the purposes of guiding or carrying the chain 88, and particularly the upper run 98 thereof, there is provided track means including an elongated track part 116 which, as best seen in Figure 5, extends from substantially the front of the floor 46 to substantially the rear of the floor 58. Although, as shown in the figure just referred to, the top of the husk box is open at 80, the track part 116 extends thereacross and centrally between the two sets of husking rolls. The underside of the upper run 98 of the chain 88 rides on this track part as the chain progresses rearwardly.

A further part of the track means includes hold-down means in the form of a fore-and-aft extending rod 118 having its lower end secured in a bracket 120 in the boot 74 and having its rear end secured in a bracket 122 provided just below the rear lower sprocket 106. The forward end of the rod 118 is preferably threaded to carry lock and adjusting nuts 124. The rear end of the rod is also threaded and carries lock and adjusting nuts 126. This rod parallels the upper run 98 of the chain and also parallels the track part 116, contacting the chain from above and engaging the rollers 92 of the chain so as to retain the chain, substantially throughout its length, against upward displacement relative to the husking rolls and floors 46 and 58.

It is a feature of the invention, in addition to the use of the hold-down means generally, that the rod is curved at 128 concentrically with the rear loop of the chain 88 where it passes about the sprocket 104. The rod further extends downwardly and rearwardly at 130 to its connection at 122. Thus, the chain 88, through that phase of its operation during which it is handling ears of corn, is retained and guided, not only by the rod 118 but also by the central elongated track 116. The holding down of the chain by the rod 118 eliminates climbing of the chain, particularly while moving ears over the husking rolls. Inasmuch as the rod engages between the links of the chain (Figure 4), and further inasmuch as the track part 116 is similarly engaged with the chain from below, the entire chain is prevented from lateral displacement during its rearward travel over the floor 46, the husking rolls and the rear floor 58, all of which contributes materially to the efficient handling of ears in the transfer thereof from the gathering mechanism to the hopper 82.

The adjustability of the rod 118 at 124 and 126 enables relatively accurate adjustment of the rod relative to the chain. Particularly, the front adjustment provides for placing the proper amount of tension in the rod. The chain is so retained and guided by the components 116 and 118 of the track means that it operates with a minimum of noise and friction.

As previously stated, the bottom of the husk box includes a downwardly and forwardly inclined support 68. The lower run 100 of the chain 88 runs just above this support and is additionally guided by a relatively short fore-and-aft extending guide rod 132.

In the particular embodiment of the invention shown, husks removed from ears of corn by the husking rolls 50—52 and 54—56 are discharged downwardly to be received by a rotatable, rearwardly moving husk auger 134. This auger operates over a perforated floor 136 and kernels of corn dislodged by the husking operation pass through the perforated floor to be moved rearwardly by a parallel, shelled-corn auger 138. As shown in Figure 1, the husk auger 134 terminates at 140 and husks are discharged laterally outwardly at this point. However, the shelled-corn auger continues rearwardly through a continuation trough 142 so that kernels are discharged at 144 in the ear-discharge zone 58—114. These details are relatively unimportant here but are described to complete the environment in which the invention is illustrated. Driving mechanism for the husk auger 134 and shelled-corn auger 138 is indicated at 146, including mechanism contained at least in part within the housing 70. This drive mechanism forms no part of the invention and further illustration and description thereof are deemed unnecessary.

Figures 6 through 8

Figure 6:
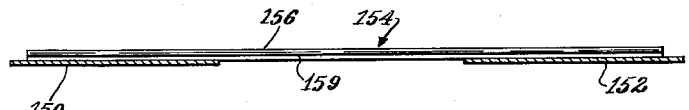
Figure 6 is a side elevational view of a structure based on a modification of that shown in Figures 1-5.
Figure 7:
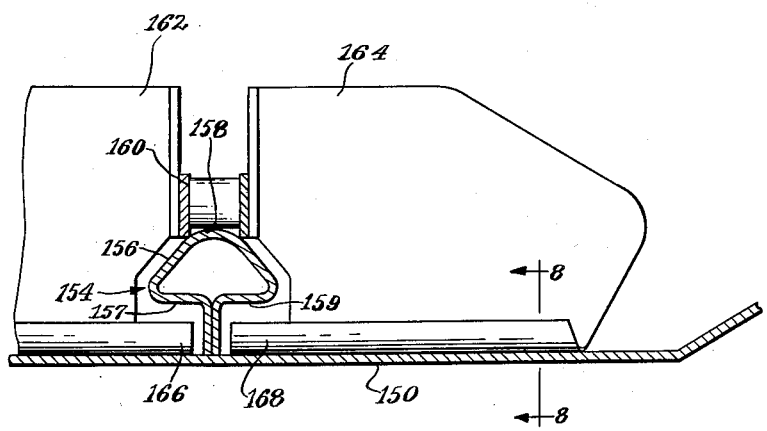
Figure 7 is a fragmentary transverse sectional view, on an enlarged scale, showing the modified structure of Figure 6 in connection with a modified conveyor.
Figure 8:
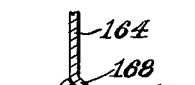
Figure 8 is a fragmentary sectional view taken on the line 8—8 of Figure 7.

In this form of the invention, the basic components may be the same as those previously described and illustrated. The upper portions of the husk box, that is the floor portions 46 and 58, are replaced respectively by floor portions 150 and 152 (Figure 6). The track means comprises an elongated, fore-and-aft extending means designated generally by the numeral 154 and comprising a track part 156 having an upper surface 158 on which the upper run of a chain 160 rides. This chain, like the chain 88, is made up of articulately interconnected links and rollers, as will be clearly apparent from Figure 7. The track means further includes hold-down means, in this case comprising parallel grooves 157 and 159 formed respectively at opposite sides of the elongated means 154. The conveyor of which the chain 160 is a part includes a plurality of oppositely extending flights 162 and 164. These flights respectively include lower portions 166 and 168 which are respectively slidably engaged and received by the grooves 157 and 159, the hold-down means thus cooperating to prevent upward displacement of the chain 160 relative to the husking means over which it operates. The construction of the flight 164 is shown in Figure 8, wherein it will be seen that the lower portion 168 thereof is formed as a rolled section. The flight 162 and portion 166 thereon are similarly constructed.

Summary

In both forms of the invention, there is utilized, preferably, a single endless conveyor of the link and roller type which is retained and guided by track means serving to carry the chain and serving also to retain the chain against upward displacement. In either case, the invention with slight modifications apparent from the present disclosure may be adapted to harvesters and other crop-handling machines.

Various other features and objects of the invention, not specifically enumerated herein, will undoubtedly occur to those versed in the art, as likewise will many modifications and alterations in the preferred forms of the invention illustrated, all of which may be achieved without departing from the spirit and scope of the invention as defined in the appended claims.

What is claimed is:

1. In a corn harvester having fore and aft extending supporting structure carrying corn-gathering mechanism in front and corn-husking mechanism at the rear and ear-discharge means behind and for receiving husked ears from the husking mechanism and for discharging such ears downwardly, the improvement comprising: a single, flexible endless corn-ear-moving conveyor element having a front loop adjacent the gathering mechanism and extending and movable rearwardly in an upper run from said forward loop, over the husking mechanism and thence curving downwardly over the ear-discharge means in a rear loop, and extending thence forwardly to said forward loop in a lower run below the husking mechanism and in vertical alinement with said upper run; front and rear means respectively supporting the conveyor element at its forward and rear loops on the supporting structure; a plurality of spaced, corn-ear-engaging flights projecting laterally from opposite sides of the conveyor element; fore and aft extending means carried by the supporting structure and engaging the upper run of the conveyor element from below to sustain said upper run over the husking mechanism; and fore and aft extending hold-down means having a forward portion fixed to the supporting structure adjacent said forward loop and extending rearwardly in parallelism with said upper run and centrally between said oppositely projecting flights in position to engage and act downwardly on said upper run, said hold-down means following said upper run substantially throughout its length and curving downwardly about said rear loop and having a rear portion fixed to the supporting structure.

2. In a corn harvester having fore and aft extending supporting structure carrying corn-gathering mechanism in front and corn-husking mechanism at the rear and ear-discharge means behind and for receiving husked ears from the husking mechanism and for discharging such ears, the improvement comprising: a single, flexible endless corn-ear-moving conveyor element having a front loop adjacent the gathering mechanism and extending and movable rearwardly in an upper run from said forward loop, over the husking mechanism and thence curving downwardly adjacent the ear-discharge means in a rear loop, and extending thence forwardly to said forward loop in a lower run below the husking mechanism and in vertical alinement with said upper run; front and rear means respectively supporting the conveyor element at its forward and rear loops on the supporting structure; a plurality of spaced, corn-ear-engaging flights projecting laterally from opposite sides of the conveyor element; fore and aft extending means carried by the supporting structure and engaging the upper run of the conveyor element from below to sustain said upper run over the husking mechanism; and fore and aft extending hold-down means having a forward portion fixed to the supporting structure adjacent said forward loop and extending rearwardly in parallelism with said upper run and centrally between said oppositely projecting flights in a position to engage and act downwardly on said upper run, said hold-down means following said upper run substantially throughout its length and having a rear portion fixed to the supporting structure.

3. In a corn harvester having fore and aft extending supporting structure carrying corn-gathering mechanism in front and corn-husking mechanism at the rear and ear-discharge means behind and for receiving husked ears from the husking mechanism and for discharging such ears, the improvement comprising: a single, flexible endless corn-ear-moving conveyor element having a front loop adjacent the gathering mechanism and extending and movable rearwardly in a first run from said forward loop, proximate to and over the husking mechanism and thence curving vertically adjacent the ear-discharge means in a rear loop, and extending thence forwardly to said forward loop in a second run spaced vertically from the husking mechanism and in spaced vertical alinement with said first run; front and rear means respectively supporting the conveyor element at its forward and rear loops on the supporting structure; a plurality of spaced, corn-ear-engaging flights projecting laterally from opposite sides of the conveyor element; fore and aft extending means carried by the supporting structure and engaging the first run of the conveyor element from below to sustain said first run over the husking mechanism; and fore and aft extending hold-down means having a forward portion fixed to the supporting structure adjacent said forward loop and extending rearwardly in parallelism with said first run and centrally between said oppositely projecting flights in a position to engage and act downwardly on said first run, said hold-down means following said first run substantially throughout its length and having a rear portion fixed to the supporting structure.

4. The invention defined in claim 3, further characterized in that: the conveyor element is a chain made up of links and rollers and rides on the sustaining means via the rollers, and the aforesaid downward action of the conveyor element is effected via engagement of said hold-down means with said rollers.

5. The invention defined in claim 3, further characterized in that: the conveyor has opposite inner side portions straddling the hold-down means and providing guide members spaced apart laterally, and the hold-down means is received between and engaged from opposite sides by said guide members to stabilize the conveyor against lateral displacement relative to the hold-down means.

6. The invention defined in claim 3, further characterized in that: a floor is disposed below the first run of the conveyor element and extends rearwardly from said forward loop to and terminating at the forward portion of the husking mechanism, and said sustaining means comprises a guide element raised from said floor and extending from front to rear over the husking mechanism.

7. The invention defined in claim 6, further characterized in that: a second floor is provided below said first run and extending from the rear of the husking mechanism over the ear-discharge means, and said guide has a rearward extension continuing from the rear of the husking mechanism over said second floor.

8. In a corn harvester having fore and aft extending supporting structure carrying corn-gathering mechanism in front and corn-husking mechanism at the rear and ear-discharge means behind and for receiving husked ears from the husking mechanism, the improvement comprising: an endless belt-type conveyor for moving ears rearwardly from the gathering mechanism to and rearwardly over the husking mechanism and having front and rear loops lying in a fore and aft extending upright plane and positioned respectively ahead of and behind the husking mechanism and further having first and second vertically spaced apart runs joining said loops, said first run operating rearwardly over and in close proximity to the husking mechanism, and said conveyor further including laterally outwardly projecting, fore and aft spaced apart ear-engaging flights; and means carried by the supporting structure for sustaining and guiding the first run of the conveyor as it moves rearwardly over the husking mechanism, including a fore and aft extending track part over the husking mechanism and engaging and sustaining said first run from below and a hold-down part paralleling said track part and positioned for contacting and acting downwardly on portions of said first run to restrain said first run against upward displacement relative to the husking mechanism.

9. The invention defined in claim 8, further characterized in that: the conveyor comprises a single, endless, flexible element having inner and outer surfaces which provide upper and lower surfaces respectively on said first run portion of the conveyor; and the track part engages the lower surface and the hold-down part engages the upper surface of said first run.

10. The invention defined in claim 9, further characterized in that: said endless element is a chain made up of links and rollers; and the track part engages the first run lower surface via the rollers and between the links, and the hold-down part engages the first run upper surface via the rollers and between the links.

11. The invention defined in claim 8, further characterized in that: the track part has an upper surface on which the first run of the conveyor rides; the hold-down part comprises a fore and aft extending groove in a side of the track part; and certain of the conveyor flights have portions received by said groove for sliding in and retention by said groove as said lower run moves rearwardly.

12. The invention defined in claim 8, further characterized in that: the conveyor comprises a single, endless, flexible element; the track part has an upper surface on which the first run of said element rides; the hold-down part comprises a pair of parallel, fore and aft extending, laterally outwardly opening grooves respectively at opposite sides of the track part; and means is provided at each side of the endless element including portions projecting laterally inwardly to be received respectively by said grooves for sliding in and retention by said grooves as said lower run moves rearwardly.

13. The invention defined in claim 12, further characterized in that: flights are provided at both sides of said endless element; and said groove-receivable portions comprise portions of certain of said flights.

14. In corn-husking mechanism including an elongated husk box having front and rear ends and opposite sides and a plurality of pairs of husking rolls extending lengthwise from front to rear of the box, the improvement comprising: an elongated narrow track fixedly positioned and extending from front to rear of the husk box above and centrally between adjacent pairs of husking rolls; a conveyor including a single, flexible, endless element paralleling and riding on said track for rearward movement over the husk box, said conveyor further including oppositely outwardly extending flights secured to said endless element and projecting respectively over the adjacent pairs of husking rolls; and hold-down means fixedly positioned centrally between said oppositely outwardly extending flights and extending centrally of the husk box and parallel to said track and said endless element and positioned to engage and act downwardly on the conveyor to restrain said conveyor against upward displacement relative to said track.

15. In material-handling means having supporting structure defining a relatively wide path along which material is to be moved from one zone to another zone spaced apart lengthwise of the path, the improvement comprising: an elongated track appreciably narrower than the path along which material is to be moved and extending centrally and lengthwise of such path between the aforesaid zones; a conveyor for moving material along the path, including a single, endless, flexible, relatively narrow element paralleling and riding on the track for movement along the path, said conveyor further including at opposite sides of said endless element a plurality of oppositely outwardly projecting flights effective to traverse the path; and elongated relatively narrow hold-down means centrally between said oppositely outwardly projecting flights and paralleling the endless element and the track and positioned for engaging portions of the conveyor from above to retain the conveyor against displacement upwardly relative to the track.

16. In corn-husking mechanism including an elongated husk box having front and rear ends and opposite sides and a plurality of pairs of husking rolls extending lengthwise from front to rear of the box, the improvement comprising: a conveyor including a single, flexible, endless element extending from front to rear of the husk box above and centrally between adjacent pairs of husking rolls and arranged for rearward movement over the husk box, said conveyor further including oppositely outwardly extending flights secured to said endless element and projecting respectively over the adjacent pairs of husking rolls; and hold-down means fixedly positioned centrally between said oppositely outwardly extending flights and extending centrally of the husk box and parallel to said endless element and positioned to engage and act downwardly on the conveyor to restrain said conveyor against upward displacement relative to the husking rolls.

17. In material-handling means having supporting structure defining a relatively wide path along which material is to be moved from one zone to another zone spaced apart lengthwise of the path, the improvement comprising: a conveyor for moving material along the path, including a single, endless element appreciably narrower than the path along which material is to be moved and extending centrally and lengthwise of such path between the aforesaid zones and arranged for movement along the path, said conveyor further including at opposite sides of said endless element a plurality of oppositely outwardly projecting flights effective to traverse the path; and elongated relatively narrow hold-down means centrally between said oppositely outwardly projecting flights and paralleling the endless element and positioned for engaging portions of the conveyor from above to retain the conveyor against displacement upwardly relative to the supporting structure.

18. The invention defined in claim 2, further characterized in that: the hold-down means at its rear portion curves downwardly substantially coextensive with said rear loop.

WAYNE E. SLAVENS.

REFERENCES CITED

The following references are of record in the file of this patent:

UNITED STATES PATENTS

| Number | Name | Date |
|---|---|---|
| 1,695,902 | Sandifur | Dec. 18, 1928 |
| 1,727,021 | Nortwick | Sept. 3, 1929 |
| 1,906,692 | Lindgren et al. | May 2, 1933 |
| 1,978,968 | Steel | Oct. 30, 1934 |
| 2,403,024 | Rixon | July 2, 1946 |

FOREIGN PATENTS

| Number | Country | Date |
|---|---|---|
| 20,580 | Great Britain | June 2, 1898 |